(12) United States Patent
Willis et al.

(10) Patent No.: US 7,660,754 B1
(45) Date of Patent: Feb. 9, 2010

(54) TECHNICIAN COMMUNICATIONS SYSTEM WITH AUTOMATED CLAIMS PROCESSING

(75) Inventors: Robert H. Willis, Louisville, KY (US); Steven G. Smith, Roswell, GA (US); Danny E. Lee, Hoover, AL (US); Raul A. Jerez, Roswell, GA (US); Duane E. Skipper, Marietta, GA (US); Ralph J. Mills, Jr., Atlanta, GA (US); Mitch E. Davis, Palmetto, GA (US)

(73) Assignee: AT&T Delaware Intellectual Property Inc., Wilmington, DE (US)

( * ) Notice: Subject to any disclaimer, the term of this patent is extended or adjusted under 35 U.S.C. 154(b) by 433 days.

(21) Appl. No.: 09/746,508

(22) Filed: Dec. 26, 2000

(51) Int. Cl.
*G06Q 40/00* (2006.01)
(52) U.S. Cl. .......................... 705/34; 705/35
(58) Field of Classification Search .................. 705/34, 705/8, 32, 35
See application file for complete search history.

(56) References Cited

U.S. PATENT DOCUMENTS

| | | | |
|---|---|---|---|
| 4,776,016 A | 10/1988 | Hansen | |
| 4,905,163 A | 2/1990 | Garber et al. | |
| 5,038,283 A | 8/1991 | Caveney | |
| 5,359,649 A | 10/1994 | Rosu et al. | |
| 5,521,958 A | 5/1996 | Selig et al. | |
| 5,570,283 A | 10/1996 | Shoolery et al. | |
| 5,583,937 A | 12/1996 | Ullrich | |
| 5,623,404 A | 4/1997 | Collins et al. | |
| 5,664,110 A | 9/1997 | Green et al. | |
| 5,687,212 A | 11/1997 | Kinser, Jr. et al. | |
| 5,694,323 A | 12/1997 | Koropitzer et al. | |
| 5,696,906 A | 12/1997 | Peters | |
| 5,754,830 A | 5/1998 | Butts | |
| 5,799,279 A | 8/1998 | Gould | |
| 5,805,775 A | 9/1998 | Eberman | |
| 5,812,977 A | 9/1998 | Douglas | |
| 5,826,270 A | 10/1998 | Rutkowski | |
| 5,848,403 A | 12/1998 | Gabriner et al. | |

(Continued)

FOREIGN PATENT DOCUMENTS

EP  0 712 227  5/1996

(Continued)

OTHER PUBLICATIONS

No author; FieldCentrix Selects BellSouth's Intelligent Wireless Network to Bring Wireless Data Solution to Field Service Companies, Aug. 24, 1999; BusinessWire; Dialog copy pp. 1-2.

(Continued)

*Primary Examiner*—Richard C Weisberger
(74) *Attorney, Agent, or Firm*—Withers & Keys, LLC

(57) ABSTRACT

A system for automatically processing claims is disclosed. The system includes an application that runs on a computer. Technicians use the application to complete claims information. Claims information includes information related to damage to a company asset. The system can determine the nature and possible location of a malfunction and redirect technician resources appropriately. In another aspect, the system can receive information from multiple technicians and can determine if a single incident caused multiple technicians to be deployed and can produce a single bill that includes the costs associated with dispatching multiple technicians.

12 Claims, 3 Drawing Sheets

U.S. PATENT DOCUMENTS

Figure 1:
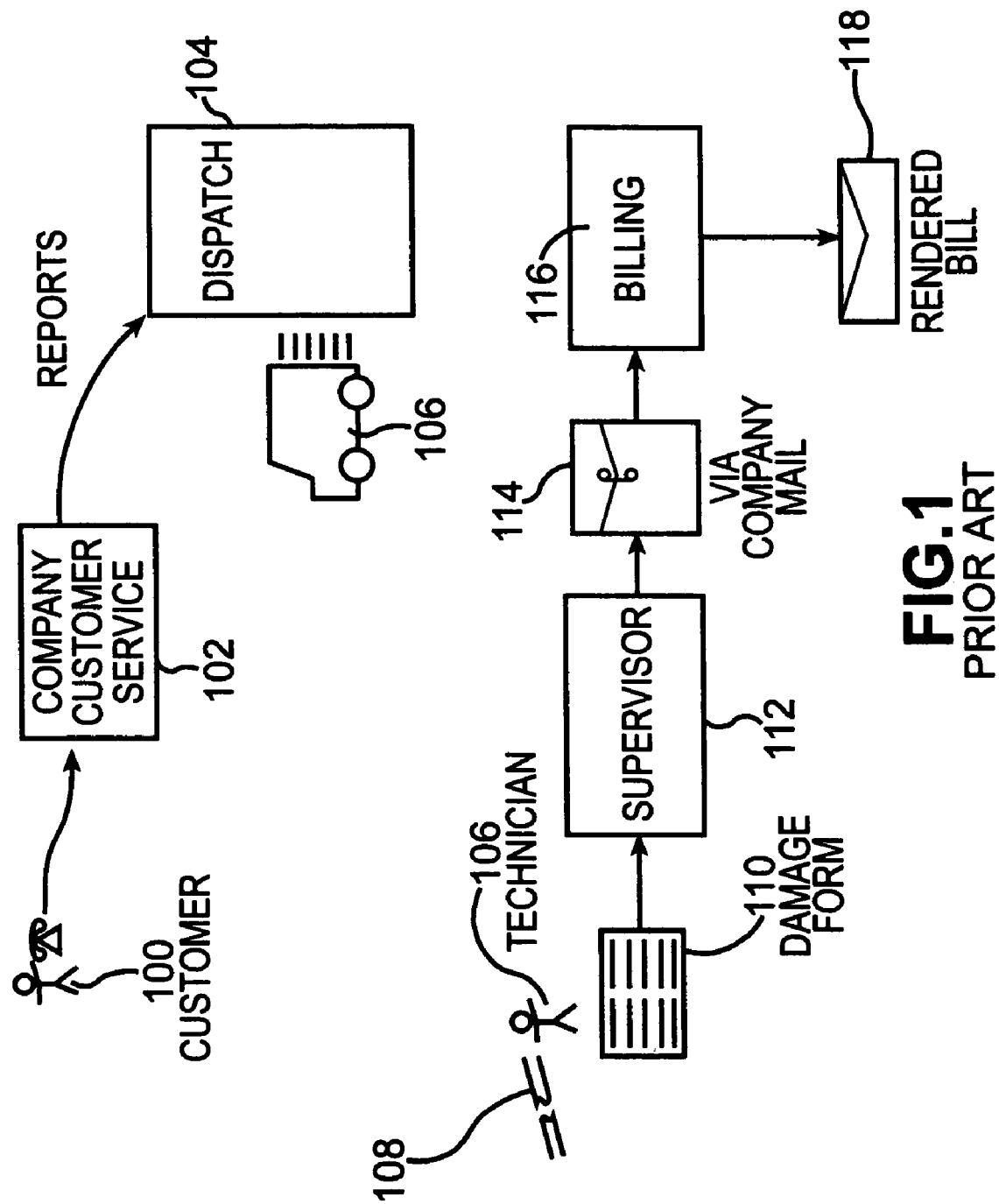

| | | | |
|---|---|---|---|
| 5,857,201 A | | 1/1999 | Wright et al. |
| 5,873,070 A | * | 2/1999 | Bunte et al. ............... 235/385 |
| 5,884,262 A | | 3/1999 | Wise |
| 5,896,440 A | | 4/1999 | Reed et al. |
| 5,909,492 A | | 6/1999 | Payne |
| 5,920,846 A | | 7/1999 | Storch et al. |
| 5,923,735 A | | 7/1999 | Swartz et al. |
| 5,931,917 A | | 8/1999 | Nguyen et al. |
| 5,953,389 A | * | 9/1999 | Pruett et al. ............... 379/9 |
| 5,960,411 A | | 9/1999 | Hartman et al. |
| 5,963,940 A | | 10/1999 | Liddy |
| 5,970,472 A | | 10/1999 | Allsop |
| 5,974,135 A | | 10/1999 | Breneman et al. |
| 6,023,683 A | | 2/2000 | Johnson et al. |
| 6,023,684 A | | 2/2000 | Pearson |
| 6,026,379 A | | 2/2000 | Haller et al. |
| 6,035,285 A | * | 3/2000 | Schlect et al. ............... 705/30 |
| 6,052,785 A | | 4/2000 | Lin |
| 6,058,373 A | | 5/2000 | Blinn |
| 6,080,202 A | | 6/2000 | Strickland |
| 6,081,789 A | | 6/2000 | Purcell et al. |
| 6,092,192 A | | 7/2000 | Kanevsky |
| 6,101,472 A | | 8/2000 | Giangarra et al. |
| 6,101,510 A | | 8/2000 | Stone |
| 6,115,040 A | | 9/2000 | Bladow |
| 6,115,737 A | | 9/2000 | Ely |
| 6,226,623 B1 | | 5/2001 | Schein |
| 6,233,541 B1 | | 5/2001 | Butts |
| 6,311,178 B1 | | 10/2001 | Bi |
| 6,324,522 B2 | | 11/2001 | Peterson et al. |
| 6,341,271 B1 | | 1/2002 | Salvo et al. |
| 6,366,829 B1 | | 4/2002 | Wallace et al. |
| 6,389,337 B1 | | 5/2002 | Kolls et al. |
| 6,445,774 B1 | * | 9/2002 | Kidder et al. ............... 379/9.03 |
| 6,473,407 B1 | | 10/2002 | Ditmer |
| 6,487,278 B1 | | 11/2002 | Skladman |
| 6,539,548 B1 | | 3/2003 | Hendricks |
| 6,578,005 B1 | | 6/2003 | Lesaint et al. |
| 6,587,851 B1 | | 7/2003 | Ditcharo |
| 6,598,167 B2 | | 7/2003 | Devine |
| 6,636,831 B1 | | 10/2003 | Profit |
| 6,671,824 B1 | * | 12/2003 | Hyland et al. ............... 714/26 |
| 6,736,376 B1 | | 5/2004 | Delisle |
| 6,738,815 B1 | | 5/2004 | Willis, Jr. |
| 2001/0016819 A1 | | 8/2001 | Kolls |
| 2002/0099642 A1 | | 7/2002 | Schwankl |
| 2002/0103906 A1 | | 8/2002 | Knight |
| 2002/0138656 A1 | | 9/2002 | Hickey |
| 2003/0023601 A1 | | 1/2003 | Fortier et al. |
| 2003/0125956 A1 | | 7/2003 | Lewis |
| 2004/0014479 A1 | | 1/2004 | Milman |

FOREIGN PATENT DOCUMENTS

| | | |
|---|---|---|
| EP | 0732850 | 9/1996 |

OTHER PUBLICATIONS

Moran et al.; "Multimodal User Interfaces in the Open Agent Architecture", Proceedings of the 2nd International Conference on Intelligent User Interfaces, Aug. 1996.

Conversay "Speech Technology Solutions", White Paper C 2001.

"Return on Investment Model", web.archive.org webpage of Norand.com, Feb. 6, 1998, pp. 1-5.

"Norand-Payback", web.archive.org webpage of Norand.com, Feb. 6, 1998, pp. 1-2.

"Norand-Products", web.archive.org webpage of Norand.com, Feb. 6, 1998, pp. 1-5.

"Norand-Case Study", web.archive.org webpage of Norand.com, Feb. 1998, pp. 1-3.

Haugen, Dyan L.; Hill, Arthur V; "Scheduling to Improve Field Service Quality", Summer 1999, Decision Sciences, 30, 3: ABI/INFORM Global, pp. 783-804.

Freedman, David H; "Case Study: Gas Attack", Aug. 25, 1997, Forbes ASAP Supplement, pp. 45-52, Dialog 01485548 01-36536.

McCarthy, Vince, "The Transformation of the Public Network", Mar. 20, 1995, Telephone, v228n12, pp. 88-100, Dialong 0100552196-54914.

Paz, Noemi M; Leigh, William; "Maintenance scheduling: Issues, results and research needs", 1994, International Journal of Operations & Production Management, v14n8, pp. 47-69, Dialog 00956565 96-05958.

Tseng, Paul C; Lewis, Malcom; "Best Practices and Design Tips", Apr. 1999, Contracting Business, v56, n4, p. 2s84(1), Dialog 06305741 54514903.

Jewett, Dale, "Service Call", Jul. 21, 1997, Automotive News, p. 61, Dialog 05140584 47847132.

Southerland, Randy; "Not your typical garbagemon", Feb. 2000, Waste Age, 31, 2, ss50, Dialog 11970477 60110303.

"The Luxury Class Database", Apr. 3, 1995, InformationWeek, n 521, p. 100+, Dialong 00593604 23168942.

Ivey, Mike; "Cub: Toughen Penalties vs. Ameritech", Sep. 7, 2000, Madison Captial Times, Madison, Wisconsin, p. 1E, ProQuest ID 59714682.

Jaffe, Charles; "Gas Supplier takes timing seriously if delivers are late, the product is free". Feb. 5, 1989. The Morning Call, Allentown, PA, p. D.01, ProQuest ID 92485879.

Lister, Karen; "Improvements cited in Portland cable service", Jul. 21, 1995, Corpus Christi Caller Times, Corpus Christi, TX., Sec. B, p. 2, ProQuest 6892257.

"Norand-Field Service", web.archive.org webpage of Norand.com., Feb. 6, 1998, pp. 1-2.

"Norand-Training", web.archive.org webpage of Norand.com., Feb. 6, 1998, pp. 1-2.

Wood, Michael; "Fighting the paperwork nemesis", Mar. 1996, American Gas, v78n2, pp. 32-33, Dialog 01179245 98-28640.

"Powering better customer service. (Boston Edison Implements mobile computing solution)", May 1997, Communication News, v34, 5n, p. 50(2) Dialog 02070908 19414033.

Kosseff, Jeffrey; "Service Delays May Lead to AT&T Fine", Jul. 18, 2001, The Oregonian, Portland, OR., p. C.01. ProQuest ID 75527844.

Derlier,Frank J et al, "How Networks Work", Millennium ed. , Que Corp. Jan. 2000.

White, Ron, "How Computers Work", Millennium ed., Que Corp. Sep. 1999.

Gralla, Preston, "How the Internet Works", Millennium ed., Que Corp., Aug. 1999.

* cited by examiner

TECHNICIAN COMMUNICATIONS SYSTEM WITH AUTOMATED CLAIMS PROCESSING

BACKGROUND

1. Field of the Invention

The present invention is directed to an automated claims transaction system and method. More particularly, the invention is directed to an automated system and method of reporting and processing claims of damage to company property, where the company operates a network.

2. Background of the Invention

Current systems and procedures used to report damage to company property are generally manual, labor-intensive and inefficient.

FIG. 1 is a schematic drawing of a Prior Art system for reporting damage to company property. When a customer 100 is experiencing problems, for example, with his or her telephone service, customer 100 would inform the company's customer service division 102. Customer service division 102 would then generate a report and the report would be sent to dispatch division 104.

A "division" is a portion of a company that performs a particular function or act. A division can be fully automated, meaning that an automated division would include only machines and/or computers. On the other hand, a division can include only human employees. A division can also include both human employees and machines and/or computers. This definition of "division" is used throughout the specification and claims, unless otherwise noted.

After reviewing the report, the dispatcher will dispatch a technician 106 to the scene. After the technician 106 has arrived at the scene, and conducted appropriate diagnostic tests, isolated the problem 108 (for example a damaged cable), and repaired the problem, technician 106 will complete a company property damage form 110.

After returning back to the company, technician 106 turns in the company property damage form 110 to his or her supervisor 112. The supervisor 112 reviews the company property damage form 110 to ensure that the form has been properly completed. Once supervisor 112 has approved the form, supervisor 112 then sends company property damage form 110 via company mail 114 to billing division 116. If the company property damage form 110 is improperly completed, then billing division 116 returns form 110 back to supervisor 112 via company mail 114. This process continues until form 110 is properly completed. The longer it takes to for billing division 116 to get the necessary information, the more likely it becomes that the information becomes unavailable or more difficult to obtain. Once the company property damage form 110 is properly completed, billing division 116 then manually re-enters all of the information contained in the company property damage form 110 into a billing system 116 and finally generates a rendered bill 118. This bill 118 is subsequently mailed to the party responsible for the damage.

The Prior Art system suffers from a number of shortcomings and disadvantages. The use of a paper damage form, and the subsequent routing of the form, is very slow and time-consuming. It is often difficult, if not impossible, to produce and render a bill within, for example, 30 days of when the technician has made the repair. Further, in the Prior Art system, there is no communication from the technician to the dispatch system. The dispatch division and the repair and billing divisions are separated and there is no communication between the two divisions. As demonstrated later in connection with the disclosure of the invention, this failure to communicate often causes an ineffective and inefficient allocation of technician resources.

Figure 2:
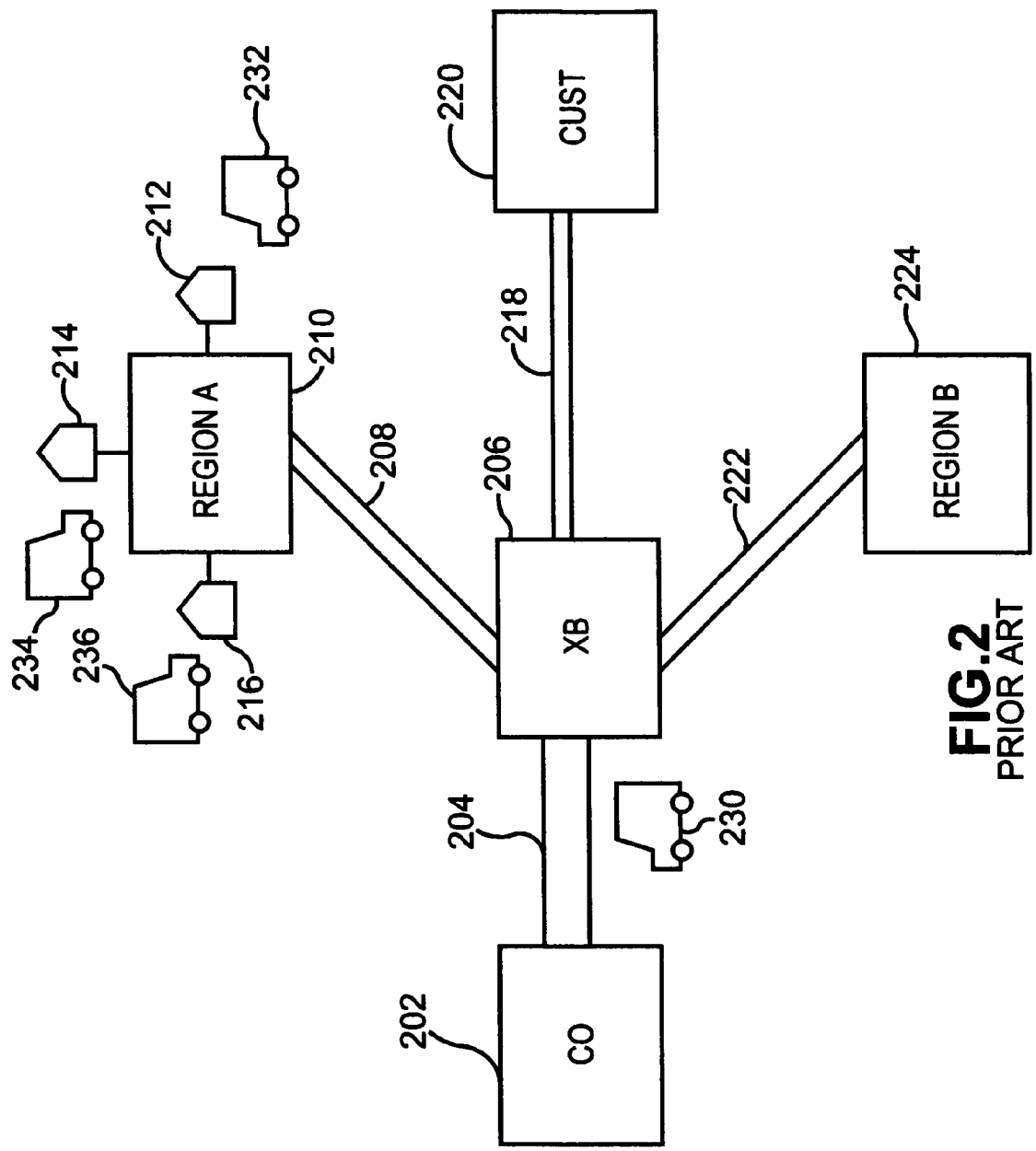

FIG. 2 is a schematic representation of a telecommunications network and includes a central office 202. A trunk line 204 extends from the central office 202 to a crossbox 206. While the described example of a network is a telecommunications network, the principles of this invention can be applied to any network including a cellular network, a fiber-optic network, a cable network, an electrical network, a network that includes water and sanitation or any other network where there is a distribution or collection of matter, energy or signals. Three branch lines emanate from crossbox 206. The first branch line 208 extends from crossbox 206 to region A 210. Typically, region A would be a neighborhood or housing development. Region A can include, for example, houses 212, 214 and 216. The second branch line 218 extends from crossbox 206 to customer 220. Customer 220 may be a large customer or a company that requires many telephone lines. The third branch line 222 extends from crossbox 206 to Region B 224. Region B again could be a neighborhood or a housing development or an apartment building.

In the context of a telecommunications network, telephone lines are typically labeled as twisted pairs and as twisted pair numbers. In the following example, trunk line 204 includes twisted pairs 1 through 600. The first branch line 208 includes twisted pairs 1 through 200, the second branch line 218 includes twisted pairs 201 to 400, and the third branch line 222 includes twisted pairs 401 to 600.

In the case of simple repairs (for example, if house 212 has a local problem with its telephone wiring), the customer at house 212 would notify the company to report the problem. The company would then dispatch a technician 232 to house 212. The technician would resolve the problem and, after returning to the company, would inform others at the company of the nature of the problem and the cost of the repair.

For larger and more complex problems, the following scenarios often occur in the Prior Art. Consider the situation where portions of trunk line 204 have been severed. For example, heavy construction equipment, such as a backhoe, has severed portions of trunk line 204 while excavating at a site. Assuming that the damage to trunk line 204 damaged twisted pairs 1 through 200, this would in turn cause the entire region A to be without service from the network.

It is likely that the company will receive many calls from customers in the region indicating a malfunction. In the example, the customer at house 212, the customer at house 214 and the customer at house 216 will inform the company of the malfunction. In response, the company dispatches a first technician 232 to the first house 212, a second technician 234 to the second house 214 and a third technician 236 to the third house 216. After all three technicians arrive, they would discover that the problem lies not within the internal wiring of the customer's house or the wire from the telephone pole to the house, but that a problem has occurred somewhere else in the network.

After the company has been informed by these technicians, it is likely that the company will dispatch a special technician either to branch line 208 to determine if the malfunction has occurred there or to trunk line 204. Since the first three technicians have realized that the problem does not lie within the houses to which they were dispatched, the three technicians return back to the company, or are assigned by the company to other tasks.

To attend to the possible branch line or trunk line problems, the company will dispatch a fourth technician 230 to trunk line 204. The technician will discover the nature of the problem, that is, that a backhoe has severed portions of trunk line 204 and has damaged twisted pairs 1 through 200. The technician will repair the damage and will return back to the company.

If the damage to trunk line 204 has been caused by another company (the owner or operator of the backhoe), the company that owns the network preferably bills the company responsible for the damage to trunk line 204, or in the alternative, the company that owns the network could also bill its insurance carrier for damage to its network. In the Prior Art system, the only task that would be billed to either the company causing the damage or the insurance company would be the time logged by the fourth technician 230. All of the time logged by the first three technicians 232, 234 and 236, would not be accounted for, and the company would lose significant revenue by failing to account for the time spent by these other technicians. In addition, the company will have dispatched four technicians when only one technician would have been sufficient to solve the problem.

In failing to quickly recognize the nature of the problem, the company has wasted valuable resources by dispatching the first three technicians, who are unnecessary to resolving the problem. Additionally, the company has also lost revenue because the company could not correlate the time spent by the first three technicians with the damage incident to trunk line 204.

SUMMARY AND OBJECTS OF THE INVENTION

The present invention includes provisions automate the processing of claims billing. The system is preferably implemented using a wireless communication system. Accordingly, the system includes a dispatch division adapted to receive reports of a malfunction of company property. Typically, these reports are based on customer complaints received by the company. The dispatch division then dispatches a technician in response to the report. Once on the scene, or shortly after the repair has been completed, the technician provides information related to the malfunction back to the company via the wireless communications network. The company uses the information related to the malfunction to automatically generate a bill.

In another aspect, the invention includes a system for automating the processing of damage claims to company property. A dispatch division is adapted to receive first and second reports of a malfunction of company property where the first and second reports are different. The dispatch division is capable of dispatching a first and second technician in response to the first and second reports. The first technician provides information related to the malfunction back to the company via a network. The dispatch division reviews the information related to the malfunction from the first technician, and based on that information, refrains from dispatching the second technician. The company also uses the information related to the malfunction to automatically generate a bill.

In another aspect, the invention includes a system for automating the processing of damage claims to company property, where the company property includes a first asset and a second asset. A dispatch division within the company is capable of receiving a first report of a first malfunction and a second report of a second malfunction. The dispatch division is capable of dispatching a first technician in response to the first report and a second technician in response to the second report. After they have completed their repairs, the first and second technicians both provide information related to their actions and information related to the cost of their actions to the company. The system includes provisions whereby the company determines that the first malfunction caused a problem that resulted in both the first and the second reports. The company then prepares a bill that includes the cost of both the first and second technicians' actions.

Accordingly, the present invention is directed to a system that provides a dispatch system with automated claims processing that substantially obviates one or more of the problems due to limitations and disadvantages of the related art.

An object of the present invention is to simplify the claims-billing process.

Another object of the present invention is to automate the claims-billing process.

Another object of the present invention is to reduce the time between a technician's repair and the time a bill is mailed.

Another object of the present invention is to reduce the manual work of clerical employees.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF A PREFERRED EMBODIMENT(S)

Figure 3:
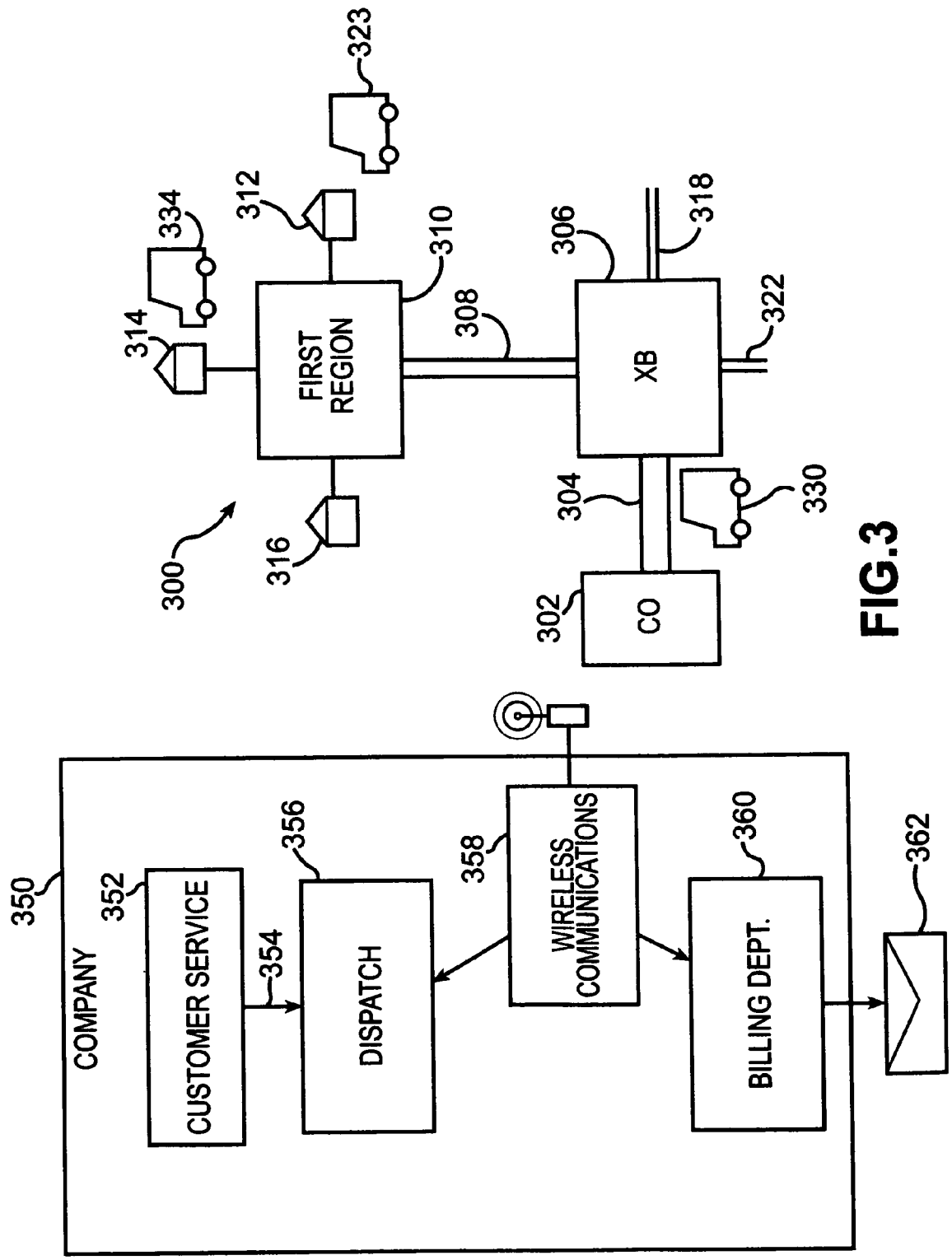

FIG. 3 is a schematic drawing of a preferred embodiment of the present invention. This embodiment of the invention can be understood with reference to a company 350 that operates a network 300. Network 300 can be any type of network, as mentioned above, but, for purposes of clarity, this present description will be limited to a communications network. The network 300 includes a central office 302, and a trunk line 304, that extends between central office 302 and a crossbox 306. Other central offices and crossboxes could be connected to central office 302. For clarity, FIG. 3 shows merely a small relevant portion of a potentially vast network that could comprise hundreds or thousands of central offices and crossboxes. In addition, the network 302 could be the same size as network 302, shown in FIG. 3, or even smaller. The present invention is applicable to all sizes and types of networks.

Three branch lines, a first branch line 308, a second branch line 318, and a third branch line 322 emanate from crossbox 306. The first branch line 308 connects crossbox 306 with a first region 310. The first region 310 can be a neighborhood, for example. Three dwellings, first dwelling 312, second dwelling 314, and third dwelling 316 comprise a portion of a first region 310.

Similar to the network described in connection with FIG. 2, network 300 includes a number of cables referenced as twisted pairs. Assuming a similar layout as the network shown in FIG. 2, network 300 would include the following twisted pair groups. Trunk line 304 would include twisted pairs 1-600, first branch line 308 would include twisted pairs 1-200, second branch line 318 would include twisted pairs 201-400, and the third branch line 322 would include twisted pairs 401-600.

Given this configuration of network 300, operation of the preferred embodiment can be understood when a problem similar to the one affecting the prior art system is applied to network 300 shown in FIG. 3. Once again, consider the situation where damage has occurred to trunk line 304. Twisted pairs 1-200 have been damaged or severed, while the remainder of trunk line 304 is unaffected and continues to operate.

Recall that twisted pairs 1-200 extend from trunk line 304, through crossbox 306 and ultimately to first region 310. Soon after damage has occurred to trunk line 304, company 350 would receive calls from affected customers. In this case, residents from first region 310 would call company 350 to report problems. The calls are preferably handled by a customer service division 352. Preferably, once customer service division 352 has received the call and recorded the identity of the caller, the nature of the problem, and other information related to the customer's complaint, customer service division 352 communicates appropriate information to dispatch division 356. Preferably, the form of communication between customer service division 352 and dispatch division 356 is a report 354.

In the present example, first dwelling 312 is the first customer to call company 350. As previously discussed, customer service division 352 receives the call, generates a report 354 or some other communication, and informs dispatch division 356. Dispatch division 356 then dispatches a technician 323 to first dwelling 312. Dispatch division 356 can dispatch technician 323 by using traditional methods or by using a wireless communications system 358. Any suitable wireless communications system can be employed, but TECHNET, is the preferred wireless communications system. TECHNET is disclosed in a co-pending, commonly owned U.S. patent application Ser. No. 09/343,815, entitled, "System and Methods for Utilizing a Communications Network for Providing Mobile Users Access to Legacy Systems," filed on Jun. 30, 1999, the entirety of which is hereby incorporated by reference.

After technician 323 arrives at first dwelling 312, technician 323 begins to assess and diagnose the problems encountered by the customer in first dwelling 312. Meanwhile, the customer residing at second dwelling 314 contacts company 350 because of problems they are experiencing with network 300. Preferably, following similar steps in dispatching the first technician 323, company 350 dispatches a second technician 324. The second technician 324 proceeds along the same lines as the first technician 323, and begins to assess and diagnose the problems reported by the second customer in the second dwelling 314.

When first technician 323 has completed diagnostic work, first technician 323 contacts company 350. Preferably, first technician 323 uses the preferred wireless communications system 358 to communicate with company 350. Preferably the wireless communications system 358 includes at least one laptop in communication with wireless communications system 358. In one embodiment of the present invention, an application that resides on the laptop assists the technician in communicating with the communications network 358 and assists the technician in reporting and capturing the results of the technician's diagnosis and subsequent remedial actions taken by the technician.

Through this system, first technician 323 informs company 350 that there are no problems with network 300 at first dwelling 312. In the case of a communications network, first technician 323 would report that there were no problems with the line from a telephone pole to first dwelling 312 and there were no problems with the internal wiring of first dwelling 312. Preferably, the information sent to company 350 via wireless network 358 is shared with various divisions in company 350. Preferably, dispatch division 356 receives the information sent by first technician.

Preferably, second technician 324 also informs company 350 of the results of the diagnostic work conducted at second dwelling 314. In the preferred embodiment, second technician 324 also uses the preferred wireless communications system 358. The information sent by second technician 324 is also shared by various different divisions at company 350, including dispatch division 356. In this example, second technician 324 would report that were no problems with network 300 at second dwelling 314.

The information sent by first technician 323 and second technician 324 are received by dispatch division 356 and analyzed. The information can be analyzed in many different ways. Dispatch division 356 analyzes the data by quickly ascertaining the nature of any problem network 300 is experiencing, and allocating available technician resources in the most efficient manner. It is particularly important in this regard to ascertain the exact location, both physically and logically (that is, within the hierarchical or topographic logic of a network), of a network defect or problem.

Dispatch division 356 can apply either their understanding of the topology of network 300 or the specific resources or assets of network 300 that are related to its various customers to determine the nature and location of the problem. Dispatch division 356 can also apply both its understanding of the topology and the specific resources or assets of network 300 that related to its various customers. In the present example, the numbers of the twisted pairs are used to associate specific network resources or assets with customers, and dispatch division 356 considers these twisted pair numbers to determine the nature of the problem.

Assuming that first dwelling 312 has been assigned twisted pair number 90 and second dwelling 314 has been assigned twisted pair number 140, dispatch division 356 will consider these twisted pair number assignments when assessing the nature of the problem and in considering possible solutions to the problem.

As dispatch division 356 receives information from the first and second technicians 323 and 334, respectively, dispatch division 356 will know that the first dwelling 312 uses twisted pair number 90 and will also know that the second dwelling 314 uses twisted pair number 140. When dispatch division 356 receives the results of the first and second technician's diagnosis (that there were no problems with the network resources used by the customers in the first and second dwellings), dispatch division 356 will realize that the problems encountered by those customers were not caused by isolated problems affecting just a single dwelling. Since the problem is not isolated, dispatch division 356 will then consider other resources or assets of network 300 that could be causing the problems experienced by the customers in the first and second dwellings, 312 and 314, respectively.

Dispatch division 356 will then check the twisted pair numbers of the first and second dwellings, 312 and 314, respectively. At this point, dispatch division 356 will realize that both the first dwelling 312 and the second dwelling 314 have twisted pair numbers that are within a particular range of twisted pair numbers, in this case 1-200, and that this range corresponds to the twisted pairs contained in first branch line 308. Dispatch division 356 determines that the likely problem is with first branch line 308 or some other network asset, and that there are probably no problems with individual network assets in a first region 310.

After a decision has been made that the problem is likely caused by a network asset other than an individual customer's network asset, dispatch division 356 will cease to dispatch any other technicians to other customers who use the first branch line 308. This means that any customer who has a twisted pair number ranging from 1-200 and who calls company 350 and reports problems similar to those reported by the first dwelling 312 and the second dwelling 314, will be informed that the company is currently working to resolve the problem, and that the problem is affecting many other customers and that there is no problem with their particular network resources. This conserves technician resources and prevents additional technicians from being dispatched to portions of the network that are not damaged or broken.

Because dispatch division 356 suspects that the first branch line 308 is damaged, dispatch division 356 will deploy a third technician 330 to check the integrity of first branch line 308. When the third technician informs the company 350 that there is no damage to first branch line 308, dispatch division 356 will then deploy the third technician from branch line 308 to trunk line 304. If trunk line 304 is very far from the first branch line 308, or if the third technician 330 does not have the proper tools or equipment to access trunk line 304, or if it is more efficient to deploy a fourth technician, then dispatch division 356 may dispatch a fourth technician to trunk line 304. However, in this current example, dispatch division 356 determines that it is appropriate and feasible to redirect third technician 330 from the first branch line 308 to trunk line 304.

After the third technician 330 arrives at trunk line 304, the third technician 330 will conduct an assessment and diagnosis of trunk line 304. This diagnosis reveals that trunk line 304 has been partially severed resulting in damage to twisted pairs 1-200. The third technician makes the necessary repairs and reports the results of his analysis and the results of the repair, along with a statement related to billing information. This statement can include a description of the work done, the time required for the task, the billing rate of the technician, the cost of materials used in making the repair, and the likely cause of the damage, including the names of the parties involved in causing damage to network 300. Preferably, all communications between the third technician 330 and company 350 are done over the preferred wireless communications system.

Similarly, first technician 323 and second technician 334 will also submit statements back to company 350 that also include a description of the work done, the time required for the task, the billing rate of the technician, and the cost of materials used in diagnosing the customer's complaint.

This information is collected by billing division 360 within company 350. After all of the statements from the technicians have been received, billing division 360 then begins to compose bills. Billing division 360 analyzes the work histories, tasks, and problems resolved by the various technicians. In the example disclosed in connection with the preferred embodiment, billing division 360 will realize that the third technician 330 repaired damaged trunk line 304. The damage to trunk line 304 caused twisted pair numbers 1-200 to be out of service for a certain period of time causing other assets of network 300 to fail and, in turn, causing an interruption in service to a number of customers. Because one act (the damage to trunk line 304 and the resulting malfunction of twisted pairs 1-200) by a single party has caused widespread failure of network 300 for a number of customers, billing division 360 will gather all of the costs for any technician service associated with twisted pairs 1-200 for the period of time that twisted pair numbers 1-200 were out of service.

So, in the example given above, the costs of the three technicians 323, 334, and 330 are all added together and billed to the party responsible for damaging trunk line 304. If the damage was caused by a natural disaster, act of God, or other event that is covered by an insurance carrier, then the bill is sent to the insurance company that provides the coverage.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A method of processing reports of malfunctions received by a network service company having a dispatch division and a billing division, the method comprising:
   receiving reports from a customer of malfunctions and a request for a network evaluation;
   dispatching a technician in response to the reports;
   receiving, via a communications network, information sent by the technician upon diagnosing a malfunction at a first subscriber location having a first line number, wherein the information is provided in an electronic format and when analyzed indicates a cause of the malfunction underlying one of the reports of malfunctions sent from a vicinity of the first subscriber location and wherein the cause is at a location other than the first subscriber location, wherein the cost associated with the technician at the first location is recorded in association with the first line number, and wherein the identified cause indicates a range of line numbers that are affected including the first line number;
   determining, by the dispatch division and based upon the information sent by the technician upon diagnosing the malfunction at the first subscriber location, that a cause underlying another one of the reports of malfunctions, received from a location different from the vicinity of the first subscriber location and having a second line number, is the same cause identified as underlying the report of malfunction at the first subscriber location due to the second line number being within the range of line numbers that are affected;
   identifying, by the company, an entity other than a first subscriber of the first subscriber location that is responsible for the cause; and
   utilizing the information, by the billing division, to generate a bill to the entity other than the first subscriber that includes costs incurred at least for diagnosing the malfunction at the first subscriber location by looking up the range of line numbers associated with the cause for which the entity is responsible, finding that the first line number falls within the range, looking up the costs incurred for the first line number, and including the costs incurred for the first line number on the bill to the entity.

2. The method according to claim 1, wherein the communication network is wireless.

3. The method according to claim 1, wherein the bill is automatically generated.

4. The method according to claim 1, wherein the dispatch division also receives information related to the reports of malfunctions.

5. The method according to claim 1, wherein the one of the reports of malfunctions is associated with a twisted pair number that represents the first line number.

6. The method according to claim 1, wherein the dispatch division re-routes the at least one dispatched technician from the first subscriber location to the location different from the vicinity of the first subscriber location based on the information related to the one of the reports of malfunctions.

7. The method according to claim 1, wherein the one of reports of malfunctions and the another one of the reports of malfunctions are associated with first and second twisted pairs that represent the first and second line numbers.

8. The method according to claim 6, further comprising the step of deferring subsequent dispatch of technicians to subscriber locations other than the different location.

9. The method of claim 1, wherein determining, by the dispatch division and based upon the information sent by the technician upon diagnosing the malfunction at the first subscriber location, that a cause underlying another one of the reports of malfunctions, received from a location different from the vicinity of the first subscriber location, is the same cause identified as underlying the report of malfunction at the first subscriber location comprises receiving, via the communications network, information sent by another technician upon diagnosing a malfunction at the different location which is a location of a second subscriber, wherein the information is provided in an electronic format and identifies a cause of the malfunction underlying one of the reports of malfunctions sent from a vicinity of the second subscriber.

10. The method of claim 9, wherein the cause of the malfunction is determined to be at a third location, the method further comprising:
dispatching a technician to the third location and repairing the cause of the malfunction at the third location; and
including in the bill to the entity the costs incurred for servicing the second subscriber and the costs incurred for repairing the cause of the malfunction at the third location in addition to the costs incurred for servicing at least the first subscriber.

11. A method of processing reports of malfunctions received by a network service company having a dispatch division and a billing division, the method comprising:
receiving reports from a customer of malfunctions and a request for a network evaluation;
dispatching technicians in response to the reports;
receiving, via a communications network, information sent by the technician upon diagnosing a malfunction at a first subscriber location that is assigned a first line number, wherein the information is provided in an electronic format and that allows the dispatch division to identify a cause of the malfunction underlying one of the reports of malfunctions sent from a vicinity of the first subscriber location and wherein the cause is at a location other than the first subscriber location, wherein the cost associated with the technician at the first location is recorded in association with the first line number, and wherein the identified cause indicates a range of line numbers that are affected including the first line number;
receiving, via the communications network, information sent by another technician upon diagnosing a malfunction at a location of a second subscriber that is assigned a second line number, wherein the information is provided in an electronic format and allows the dispatch division to identify a cause of the malfunction underlying one of the reports of malfunctions sent from a vicinity of the second subscriber to be the same cause of the malfunction underlying one of the reports of malfunctions sent from the vicinity of the first subscriber, and wherein the cost associated with the technician at the location of the second subscriber;
repairing the cause underlying both of the reports of malfunctions sent from the vicinity of the first subscriber and sent from the vicinity of the second subscriber and associating cost of the repair with the cause;
identifying, by the company, an entity other than a first subscriber of the first location and a second subscriber of the second location that is responsible for the cause; and
utilizing the information, by the billing division, to generate a bill to the entity other than the first subscriber and the second subscriber that includes the costs incurred for diagnosing the malfunction at the first subscriber location, for diagnosing the malfunction at the second subscriber location, and for repairing the cause by looking up the range of line numbers associated with the cause for which the entity is responsible, finding that the first line number and the second line numbers fall within the range, looking up the costs incurred for the first line number and the second line number, and including the costs incurred for the first line number and the second line number on the bill to the entity.

12. The method of claim 11, wherein the cause of the malfunction is determined to be at a third location that is different than the vicinity of the first subscriber and the vicinity of the second subscriber.

* * * * *